(12) United States Patent
Shelton et al.

(10) Patent No.: US 9,559,520 B2
(45) Date of Patent: Jan. 31, 2017

(54) HYBRID ELECTRIC GENERATING POWER PLANT THAT USES A COMBINATION OF REAL-TIME GENERATION FACILITIES AND ENERGY STORAGE SYSTEM

(75) Inventors: John Christopher Shelton, Falls Church, VA (US); Jay Craig Geinzer, Glenwood, MD (US); Brett Lance Galura, Falls Church, VA (US); Steven Christianne Gerard Meersman, Zürich (CH)

(73) Assignee: THE AES CORPORATION, Arlington, VA (US)

( * ) Notice: Subject to any disclaimer, the term of this patent is extended or adjusted under 35 U.S.C. 154(b) by 666 days.

(21) Appl. No.: 13/527,290

(22) Filed: Jun. 19, 2012

(65) Prior Publication Data

US 2012/0323396 A1 Dec. 20, 2012

Related U.S. Application Data

(60) Provisional application No. 61/499,065, filed on Jun. 20, 2011.

(51) Int. Cl.
G05D 3/12 (2006.01)
G05D 5/00 (2006.01)
(Continued)

(52) U.S. Cl.
CPC .................. *H02J 3/381* (2013.01); *H02J 7/34* (2013.01); *H02J 3/382* (2013.01); *H02J 3/383* (2013.01);
(Continued)

(58) Field of Classification Search
CPC .............................. F03D 7/0284; F03D 9/003
(Continued)

(56) References Cited

U.S. PATENT DOCUMENTS 7,378,820 B2   5/2008  Liu et al.
7,608,937 B1  10/2009  Altenschulte
(Continued)

FOREIGN PATENT DOCUMENTS

CN   101005208 A    7/2007
CN   101919135 A   12/2010
(Continued)

OTHER PUBLICATIONS

International Search Report (PCT/ISA/210) dated Jan. 23, 2013, issued in corresponding International Patent Application No. PCT/US2012/043138.
(Continued)

*Primary Examiner* — Mohammad Ali
*Assistant Examiner* — Md Azad
(74) *Attorney, Agent, or Firm* — Buchanan Ingersoll & Rooney PC (57) ABSTRACT

Approaches for controlling power supplied to an electric grid are disclosed. In embodiments, methods and systems control power supplied to an electric grid using an energy storage device. In an embodiment, a method receives an indication of power to be supplied to the electric grid, generates power from a power generator and adjusts, using the generated power, an energy level of the energy storage device to control power supplied to the grid in accordance with the received indication. In another embodiment, a system comprises a grid indication receiver for receiving an indication of power to be supplied to the electric grid; a power generator connected to the grid; an energy storage device coupled to the power generator; and a controller for adjusting, using the generated power from the generator, an energy level of the energy storage device to control power supplied to the grid in accordance with the received indication.

28 Claims, 6 Drawing Sheets

(51) Int. Cl.
- *G05D 9/00* (2006.01)
- *G05D 11/00* (2006.01)
- *H02J 9/00* (2006.01)
- *H02J 1/00* (2006.01)
- *H02J 3/00* (2006.01)
- *H02J 7/00* (2006.01)
- *H01M 10/44* (2006.01)
- *H01M 10/46* (2006.01)
- *H02J 7/14* (2006.01)
- *H02J 3/38* (2006.01)
- *H02J 7/34* (2006.01)

(52) U.S. Cl.
CPC ............... *H02J 3/386* (2013.01); *Y02E 10/563* (2013.01); *Y02E 10/763* (2013.01); *Y10T 307/718* (2015.04)

(58) Field of Classification Search
USPC ...... 700/297; 307/23, 64, 66, 84; 363/37, 95
See application file for complete search history.

(56) References Cited

U.S. PATENT DOCUMENTS

| | | | |
|---|---|---|---|
| 8,183,714 B2 | 5/2012 | McDonnell | |
| 2004/0263116 A1* | 12/2004 | Doruk | F01K 13/00 320/107 |
| 2009/0189456 A1 | 7/2009 | Skutt | |
| 2009/0295227 A1 | 12/2009 | Chang et al. | |
| 2010/0096853 A1 | 4/2010 | Woldmann et al. | |
| 2010/0292853 A1 | 11/2010 | McDonnell | |
| 2011/0047052 A1* | 2/2011 | Cornish | B60L 11/1861 705/30 |
| 2011/0074151 A1 | 3/2011 | Burra et al. | |
| 2011/0087381 A1* | 4/2011 | Hirato | H02J 3/32 700/291 |
| 2011/0101779 A1* | 5/2011 | Patel | H02J 3/28 307/64 |
| 2011/0133556 A1 | 6/2011 | Choi | |
| 2011/0140648 A1 | 6/2011 | Lee | |

FOREIGN PATENT DOCUMENTS

| | | |
|---|---|---|
| DE | 10 2009 040 090 A1 | 3/2011 |
| JP | 2007129850 A | 5/2007 |
| WO | WO 2012/177633 A2 | 12/2012 |

OTHER PUBLICATIONS

Written opinion of the International Searching Authority (PCT/ISA/237) dated Jan. 23, 2013, issued in corresponding International Patent Application No. PCT/US2012/043138.

Feb. 12, 2015 Extended European Search Report issued in European App. 12803361.0.

Office Action (First Office Action) issued on Jun. 17, 2015, by the State Intellectual Property Office, P.R. China in corresponding Chinese Patent Application No. 201280040497.9, and an English translation of the Office Action. (26 page).

Jun. 11, 2015 Chilean Substantive Examination issued by the Chile Patent Office in Chilean Application No. 2013-03690.

Oct. 14, 2015 Substantive Examination Report issued by Chilean Patent Office in Chilean Application No. 2013-03690.

Office Action (Second Office Action) issued on Mar. 2, 2016, by the Chinese Patent Office in corresponding Chinese Patent Application No. 201280040497.9, and an English Translation of the Office Action. (23 pages).

Office Action (Questions, Arguments, Objections, Proposals) issued on May 12, 2016, by the Russian Patent Office in corresponding Russian Patent Application No. 2014101451, and an English Translation of the Office Action. (8 pages).

Office Action (Questions, Arguments, Remarks, Suggestions) issued on Sep. 13, 2016, by the Russian Patent Office in corresponding Russian Patent Application No. 2014101451 and an English translation of the Office Action. (11 pgs).

Office Action (Third) issued on Sep. 12, 2016, by the State Intellectual Property Office P.R. China in corresponding Chinese Patent Application No. 201280040497.9 and an English translation of the Office Action. (23 pgs).

European communication issued on Oct. 19, 2016, by the European Patent Office in corresponding European Patent Application No. 12803361.0. (3 pgs).

* cited by examiner

HYBRID ELECTRIC GENERATING POWER PLANT THAT USES A COMBINATION OF REAL-TIME GENERATION FACILITIES AND ENERGY STORAGE SYSTEM

CROSS-REFERENCE TO RELATED APPLICATIONS

The present application claims the benefit of U.S. Provisional Appl. No. 61/499,065 entitled "Hybrid Electric Generating Power Plant That Uses a Combination of Real-Time Generation Facilities and Energy Storage System," filed Jun. 20, 2011 which is incorporated by reference herein in its entirety.

FIELD OF THE INVENTION

The present invention is directed to systems and methods for providing generation services on a power grid and, more particularly, a hybrid electric generating power plant that uses an energy storage system.

BACKGROUND OF THE INVENTION

Typically, a utility obtains electric power from one or more primary power generation sources, such as gas-fired, coal-fired, nuclear and/or hydroelectric power plants, for delivery to customers via a distribution grid. The power supplied by these sources can vary moment-to-moment. Generally, the sources can be regulated to meet the demands of customers while at the same time conforming to the standards for such power, such as nominal voltage and frequency levels.

To supplement the power supplied by these primary sources, it is becoming more common to connect secondary sources of power, such as solar panels and windmills, to the electric distribution grid. Among other advantages, these secondary forms of energy are renewable, in contrast to the primary sources.

BRIEF SUMMARY

The present disclosure is directed to apparatus, systems, computer readable media and methods for controlling power supplied to an electric grid using energy storage devices to store energy. One exemplary method includes receiving an indication of power to be supplied to the electric grid, generating power from at least one power generator, and adjusting, using the generated power from the power generator, an energy level of the energy storage device to control the power supplied to the electric grid in accordance with the received indication.

BRIEF DESCRIPTION OF THE DRAWING/FIGURES

Exemplary embodiments are best understood from the following detailed description when read in conjunction with the accompanying drawings. It is emphasized that, according to common practice, the various features of the drawings are not to scale. On the contrary, the dimensions of the various features may be arbitrarily expanded or reduced for clarity. Included in the drawings are the following figures.

DETAILED DESCRIPTION

Unlike the relatively stable output of primary sources, the amount of energy produced by secondary sources can vary over a wide range within relatively short intervals, e.g., measured in seconds or minutes. For example, the output of a solar panel may vary not only in accordance with the time of day, but also as a result of meteorological events such as the sudden appearance and passing of clouds that block direct sunlight. Likewise, the output of a windmill farm may be subject to instantaneous gusts and/or lulls in the velocity of the wind.

A sudden upward spike (e.g., increase) in the output of a secondary source may be absorbed by the electric grid, and may be accommodated by: (1) decreasing the output of, for example, one or more of the primary sources and/or the other secondary sources; (2) storing power by the energy storage devices; and/or (3) increasing the load on the electric utility grid.

A sudden decrease in the output of the secondary source may be absorbed by the electric grid, and may be accommodated by: (1) increasing the output of, for example, one or more of the primary sources, and/or other secondary sources; (2) discharging power stored by energy storage devices; and/or (3) decreasing the load on the electric grid. In certain exemplary embodiments, a sudden spike or a sudden decrease may exceed a transmission capability of equipment on site and may result, for example, in a loss of generated power or possibly a blackout condition. These sudden changes may trip off the primary sources of power causing such blackouts or may induce additional costs at the primary sources of power, such as reduced operating capacity, increased maintenance and/or additional fuel costs associated with operation at a non-optimal operating set point.

Large swings in frequency may also exceed the distribution system's response capabilities for normal operations. For example, if a generator were suddenly to go offline or if a transmission line were to fail, a drop in frequency and/or voltage level may occur, which may create a cascading effect as more generators go offline due to the frequency and/or voltage deviation from normal operating set points (e.g., a blackout may occur). Traditional power generation equipment may not always respond swiftly enough to such changes. Grid frequency may fluctuate with load swings because power generators may slow down due to increased load or may speed up due to reduced load, thereby changing the frequency of the alternating current (AC) generated.

When managing variations in conditions on the power grid, the Electrical System Operator (ESO) may vary the output of selected power generating stations in order to accommodate the variations (e.g., stabilize the electric utility grid by operating the electric grid such that the loss of any one component of the electric utility grid may not cause the cascading effect (e.g., to prevent such blackouts). Existing electric power generating units may have constraints regarding the rapidity of progression from one level of output to another level of output (also referred to herein as "ramp rate"). Ramp rate may vary depending on the type of electric power generating unit (e.g., coal, or natural gas, among others) and the operating level (e.g., set point) of the electric generating unit. Although limits may be placed on total system capacity to satisfy ramping, the existing ramp rate for electrical power systems are generally sufficient to meet the ramping associated with primary sources of power. Small power systems, however, may have difficulty maintaining a supply/demand balance and sufficient ramping capabilities. With the advent of the secondary sources of power, there is a need for improved ramping capabilities.

In addition, a hybrid power plant that includes an energy storage device, such as batteries, may allow for a more efficient use of existing power generators. Typically, power plants withhold a portion of output to serve as spinning reserve for fast ramp-up and/or for regulation services. Spinning reserve typically refers to generators that are already online, synchronized, and generating a portion (i.e., a subset) of their total output capability. The use of such spinning reserve generation may be costly because: (1) a portion of the power generators' output cannot be used for base load capacity, (2) additional wear and tear may occur on the spinning power generators; and/or (3) additional energy may be lost and additional fuel costs may be incurred and additional emissions may be emitted due to the operation of the spinning power generators.

By including a fast ramp rate energy storage device with the power generators, the power generators may be used for base load capacity and the energy storage devices may provide regulation and fast ramp rate control allowing the power generators additional time to adjust their outputs, or to forgo changes to output altogether.

A power generating system that provides prompt rapid adjustment (e.g., decrease or increase) in power output while maintaining a high operating rate (e.g., efficiency) of an electric power generating station may better serve the present requirements of the electric grid.

In certain exemplary embodiments, systems, apparatus, and methods may maintain a stable electric grid frequency and/or voltage levels by combining responses to grid frequency and/or voltage fluctuations by one or more power generators and one or more energy storage devices. The combined response may be governed (e.g., controlled) by Power Contribution Control Equipment (PCCE). It may be noted that the present system may be used in conjunction with the system disclosed in U.S. Patent Application Publication No. 2010/0090532 entitled "Frequency Responsive Charge Sustaining Control of Electricity Storage Systems for Ancillary Services on an Electrical Power Grid," which issued as U.S. Pat. No. 7,839,027 on Nov. 23, 2010.

In certain exemplary embodiments, a controller, based on information (e.g., an indication) received, may adjust energy stored by an energy storage device (e.g., a battery, capacitor, chemical storage unit, and/or mechanical storage unit, among others) using the generated power from the power generator, and may control the power supplied to the electric grid in accordance with the received information.

Methods and apparatus for responding to changes in grid frequency or grid voltage level are described herein to enable a power plant to operate at a fixed operating rate. The apparatus may include: (1) at least one power generator configured to generate alternating current for distribution across the electric grid (e.g., power grid); and (2) at least one power storage device connected to the power grid either through the same connection as the power generator or separately. The power generator and the power storage device may be co-located in a single plant or generation site or may be distributed at different locations and coupled to the power grid. The apparatus may include a grid frequency detector and the PCCE. The grid frequency detector may be configured to detect the grid frequency for frequency changes in alternating current distributed on the power grid. The PCCE may be configured to control power contribution to the power grid by controlling the (1) discharge in storage of power with respect to at least one power storage device and (2) increasing or decreasing the power generation from at least one power generator. The PCCE may be configured to provide a response to received input such as the detected fluctuations in frequency on the power grid or voltage fluctuations on the power grid. The PCCE may, for example, provide stability by discharging stored power during changes in power generation (e.g., during ramp-up) by at least one power generator and/or storing power to prevent transmission of the power on the grid during changes in power generation (e.g., during ramp-down) by at least one power generator. The combined response of discharging store power and storing power may follow instantaneous (e.g., real-time or near real time) demand information supplied to the PCCE.

Certain exemplary embodiments may advantageously reduce wear and tear, reduce fuel costs, increase operation efficiency and/or reduce environmental impact of the primary sources of power, and may provide faster response contingencies for large load swings, shortages, and equipment failures, among others, that may otherwise lead to fluctuations in voltage and/or grid frequency. Generally, power plants are overbuilt and include excess capacity. For example, a hydroelectric plant may have a spinning but disengaged generator (e.g., a reserve generator) for grid regulation such that the reserve generator may be available (e.g., may come on line) when a variation (e.g., a rapid variation) in grid frequency or voltage level occurs, which may increase wear and tear on the reserve generator and may require overbuilding of the power plant and underutilization of the same.

Figure 1A:
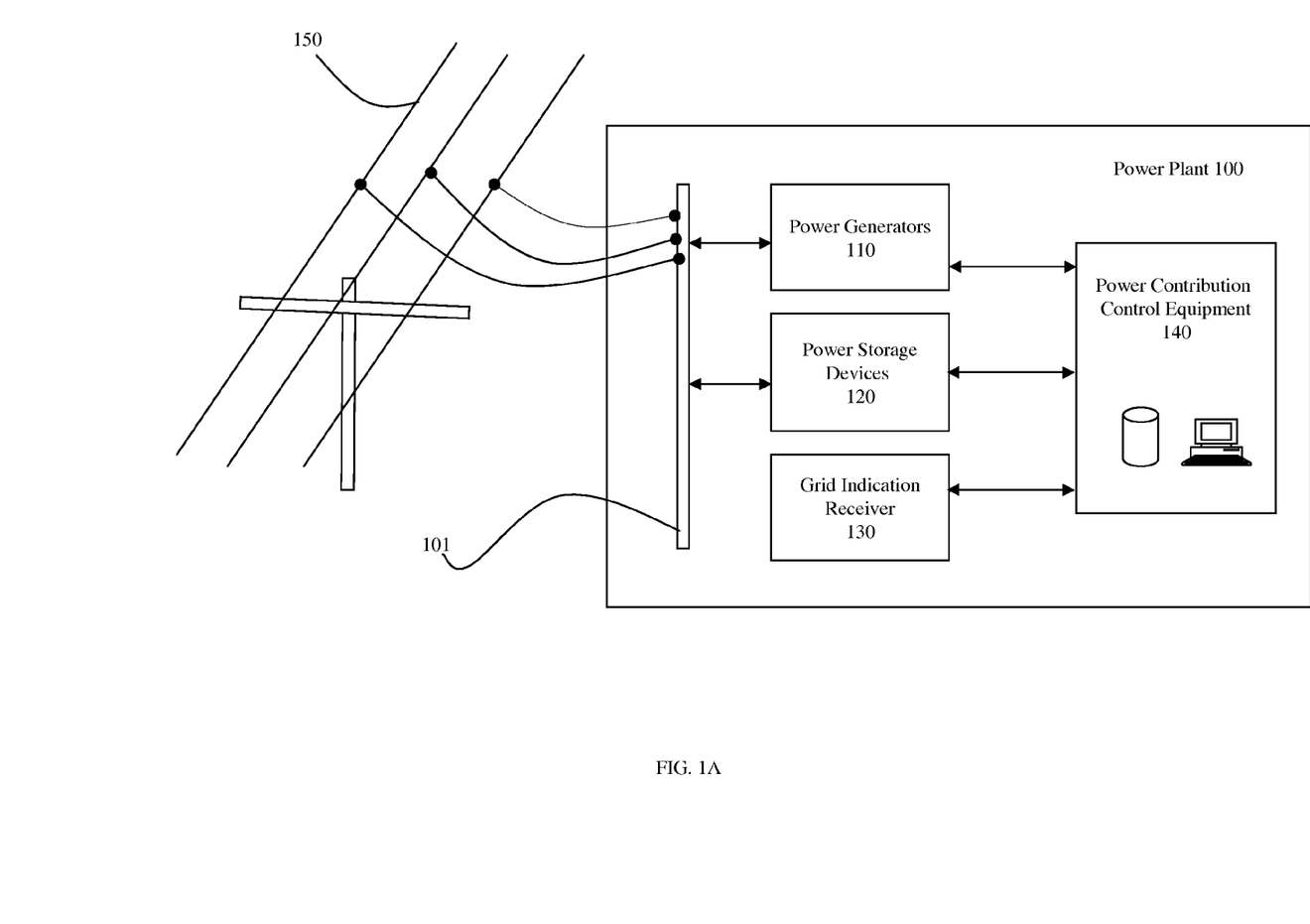
FIG. 1A is a schematic diagram illustrating an exemplary power plant connected to an electric grid, according to embodiments of the invention.

FIG. 1A is a schematic diagram illustrating an exemplary power plant 100 connected to an electric grid 150 in accordance with exemplary embodiments.

Referring to FIG. 1, a power plant 100 may be connected to a power grid 150 (e.g., utility electric grid. The illustration has been simplified for clarity to show a typical tri-phase electrical power system, but one skilled in the relevant art(s) understands that other configurations are possible. The power plant 100 may include power generators 110, power (or energy) storage devices 120, a grid indication receiver 130, power bus bar 101, and Power Contribution Control Equipment (PCCE) 140.

The power generators 110 may be connected or coupled to the PCCE 140 and to the power bus bar 101 and may be configured to generate (i.e., convert) one form of energy to electrical energy. The power generators 110 can be formed as a discrete power generator, or as a bank of individual power generators that may be connected or selectively interconnected to generate power. The power generators 110 can be hydroelectric generators, fossil fuel generators (e.g., coal generators, gas generators, oil generators, diesel generators or any other form of fossil fuel generators), nuclear power generators, and/or renewable energy sources such as wind harnessing power generators, tidal power generators, geothermal power generators, and/or solar power generators and other form of power generation that may be controlled by the PCCE 140.

The power storage devices 120 may be connected or coupled to the PCCE 140 and to the power bus bar 101 and may be configured to selectively provide energy to the power grid 150 or to selectively receive energy from the electric grid 150.

The power storage devices 120 may be, for example, batteries or capacitors in combination with batteries to provide bursts of energy (e.g., short term bursts of energy of less than a threshold duration). The power storage devices 120, in the alternative or in addition, may be, for example, inertial power systems such as flywheels, pneumatic systems that compress a gas to be released in mechanical system to rotate an electrical generator, or suspended mass systems such as water pump systems that deliver water to a higher level near a hydro-electric plant for later use in the generation of electricity. By no means, however, is the power storage devices 120 limited to these examples.

Although the power storage devices 120, as shown in FIG. 1 and described above, are co-located in the power plant 100 with the power generators 110, it is contemplated that other configurations are possible. For example, in some exemplary embodiments, the power storage devices can be distributed along the electric grid 150. In other exemplary embodiments, the power storage devices may be co-located in the power plant with the power generators as well as being distributed along the electric grid 150. These configurations may be advantageous insofar as power storage devices tend to be discrete and compact and can be placed in distributed locations without significant costs. The power generators 110 may be dependent upon the location of hydropower, water supplies and/or fuel supplies, among others. In this way, the power storage devices 120 may be located closer to the loads or distributed for load balancing within the electric grid 150. Other synergies for collocating energy storage devices 120 with the power generators 110 include, but are not limited to, sharing of: control and monitoring systems, operations and maintenance personnel, substations, electrical switch gear, and transformers between energy storage devices 120 and power generators 110. Additionally, provision of Volt-Amperes Reactive (VAR) support required by local power generators 110 is possible when they are collocated with energy storage devices 120.

The output of the power generators 110 and the output of the power storage devices 120 may be coupled to power bus bar 101 which may be coupled via a station transformer (not shown) to the electric grid 150. The power bus bar 101 may be connected to the power generators 110, the power storage devices 120, and the electric grid 150 and may be configured to transfer electricity from the power plant 100 to the electric grid 150 for distribution.

Although the power bus bar 101 and the power storage devices 120 are shown in FIG. 1 and described above as being electrically connected, in some exemplary embodiments, the power storage devices 120 may be coupled directly to the electric grid 150. In certain exemplary embodiments, the energy stored in the energy storage devices 120 may be DC power and an AC/DC bidirectional converter may be included between the energy storage devices 120 and the power bus bar 101 to convert between AC power on the power bus bar 101 and the DC power of the energy storage devices 120.

The grid indication receiver 130 may be operatively coupled to (e.g., wired or wireless connected to) the PCCE 140 for receiving an indication of power to be supplied to the electric grid 150. The grid indication receiver 130 may receive: (1) a signal that indicates a current (e.g., present) power supply level to be supplied to the electric grid; (2) a signal indicating a grid frequency for determining a current adjustment to the power to be supplied to the electric grid 150; and/or (3) one or more operating parameters indicating one or more operating set points for a combination of the power generators 110 and the power (energy) storage device 120.

Responsive to receiving the one or more parameters indicating one or more operating set points, the PCCE 140 (e.g., controller) may determine one or more other operating set points for each of the power storage devices 120 and the power generators 110 such that the combination of the set points of the at least one power generator 110 and the energy storage device 120 satisfies the set points associated with the received one or more operating parameters.

The PCCE 140 may control (e.g., adjust) the generated power from the power generators 110 simultaneously with the adjustment of the energy (or power) stored by (or in) the energy storage devices 120 to meet or satisfy the power to be supplied to the electric grid 150. For example, the PCCE 140 may control the adjustment of the generated power from the power generator 110 by simultaneously: (1) discharging the energy storage devices 120 and increasing the power supplied from the power generators 110; (2) discharging the energy storage devices 120 and decreasing the power supplied from the power generators 110; (3) charging the energy storage devices 120 and decreasing the power supplied from the power generators 110; and/or (4) charging the energy storage devices 120 and increasing the power supplied from the power generators 110.

As would be understood by those skilled in the relevant art(s), control of charging and/or discharging of an energy storage device may be accomplished by, for example, a bidirectional inverter for AC-to-DC power conversion or a bidirectional DC-to-DC converter for DC-to-DC conversion and that the charging mode and discharging mode of such a bidirectional device may be controlled based on external signals such as various set points and/or voltage/frequency indicators. One skilled in relevant art would also understand that control of the power generators may be independent of control of the energy storage device. The net output from the power generators and the energy storage device may be controlled, for example: (1) to optimize ramp rate for the combination of the power generators and the energy storage device; (2) to reduce maintenance of the energy storage device and/or the power generators; and/or (3) to reduce spinning reserve services of the power generators, among others.

The PCCE 140 may determine power contribution from the power generators 110 (e.g., each generator) and power contribution from the power storage device 120 to satisfy the indicated current power supply level for the electric grid 150, in response to receiving a signal that indicates the current combined power supply level to be supplied to the electric grid from the power plant 100.

For example, the PCCE 140 may control discharging of stored energy (or power) by the power storage devices during initial ramp-up in power generation by the power generators 110 and/or may control storage of power by the power storage devices 120 for later transmission on the electric grid 150 during ramp-down in power generation by the power generators 110.

The set point for energy storage in the power storage devices 120 may be varied based on expected power demands on the electric grid 150. For example, energy may be stored in the power storage devices 120 at a lower level, below capacity, during periods in which the power demands on the electric grid 150 may be expected to decrease, and at a higher level during periods in which the power demands on the electric grid 150 may be expected to increase.

The PCCE 140 may control or adjust the storage of energy by the power storage devices 120 according to an optimum or predetermined profile (e.g., a power discharge and storage profile) of the power storage devices 120 and may control or adjust, based on the optimum or predetermined profile of the power storage devices 120, the power generation by the power generators 110 to satisfy the indication received by the grid indication receiver 130.

The PCCE 140 may control or adjust the power generation from the power generators 110 according to an optimum or a predetermined ramp profile of the power generators 110 and may control or adjust, based on the optimum or predetermined ramp profile, the energy level of the energy storage devices 120 to satisfy the indication received by the grid indication receiver 130.

Although the power generators 110 are described in terms of plural generators, it is contemplated that in certain exemplary embodiments a single power generator 110 may be used. Although the energy storage devices 120 are described in terms of plural storage devices, it is also contemplated that a single energy storage device 120 may be used.

In certain exemplary embodiments, the received indication may be a sequence of indications indicating the power to be supplied to the electric grid over a period of time. For example, the received indication may be a sequence of communication messages including real-time indications of the power to be supplied to the electric grid 150.

In various exemplary embodiments, the power storage devices 120 may have a ramp rate or a power transient response that is faster than the ramp rate or power transient response of the power generators 110 such that regulation (e.g., regulation services) may be supplied by the power storage devices 120.

In various exemplary embodiments, the PCCE 140 may determine a low frequency component of the received sequence of indications associated with power supply fluctuations below a threshold frequency and a high frequency component of the received sequence of indications associated with the power fluctuations at or above the threshold frequency. The PCCE 140 may control or adjust the energy level of the power storage devices 120 in accordance with the determined high frequency component and may adjust generation power by the power generators 110 in accordance with the determined low frequency component.

As will be appreciated by persons skilled in the relevant art(s), PCCE 140 may include various switches and relays, a database and computer equipment including a non-transitory computer readable storage medium having stored therein computer software such as program code to control at least the power storage devices 120.

In this document, the terms "computer program medium," "non-transitory computer readable medium," and "computer usable medium" are used to generally refer to storage media such as a hard disk, memories, which can be memory semiconductors (e.g. DRAMs, etc.).

Figure 1B:
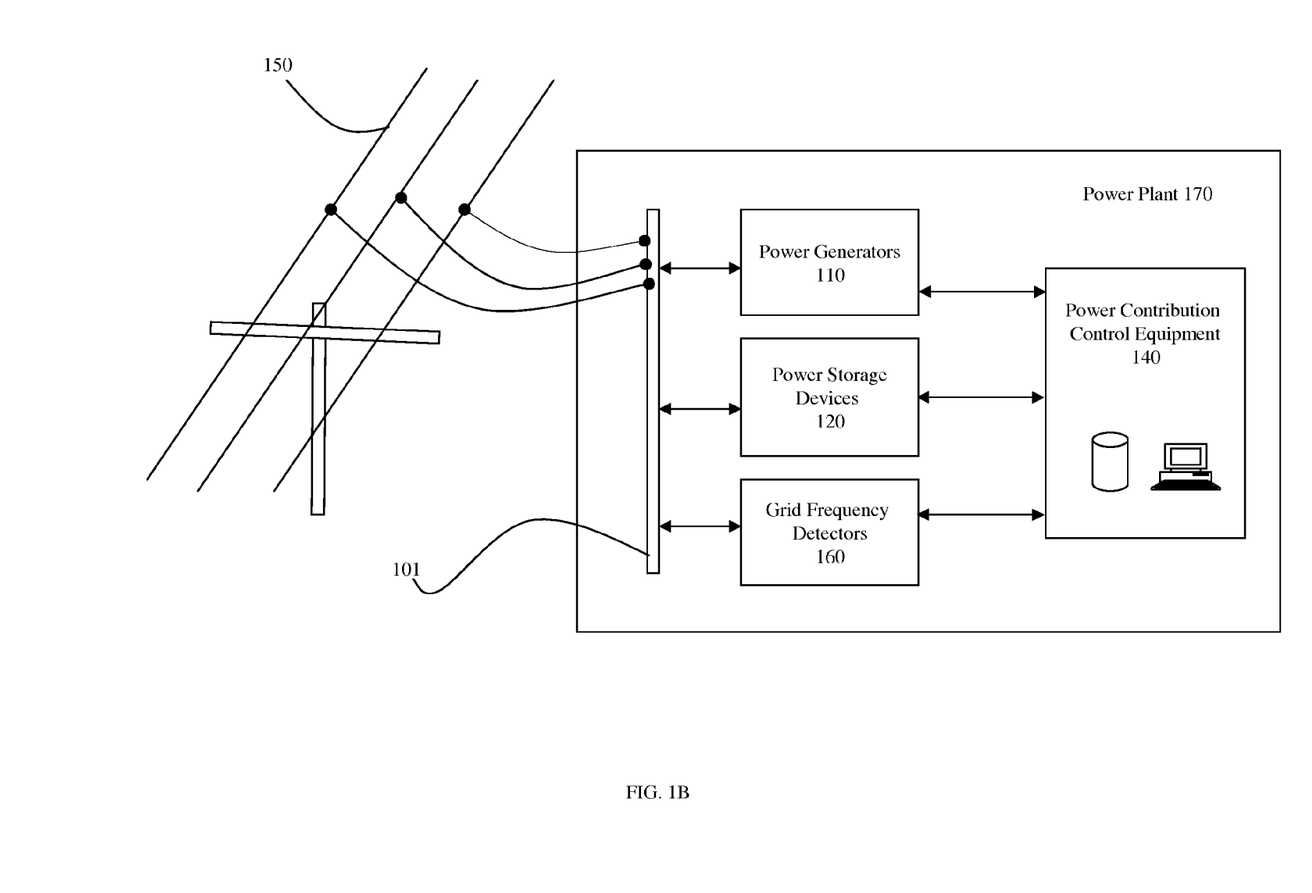
FIG. 1B is a schematic diagram illustrating another exemplary power plant connected to an electric grid, according to embodiments of the invention.

FIG. 1B is a schematic diagram illustrating another exemplary power plant 170 connected (or coupled) to the electric grid 150 in accordance with exemplary embodiments.

Referring to FIG. 1B, a power plant 170 is similar to power plant 100 except that power plant 170 may not include the grid indication receiver 130 and may include a grid frequency detector 160.

The grid frequency detector 160 may be coupled (e.g., connected) to the PCCE 140 and the power bus bar 101 (or directly to the electric grid 150) and may be configured to detect and report changes in grid frequency. Based on reports, signals or messages from the grid frequency detectors 160, the PCCE 140 may control the power storage devices 120 for storing power generated by the power generators 110, thus, effectively preventing energy from reaching the electric grid 150. Conversely, the PCCE 140 may control the power storage devices 120 to actively remove energy from the electric grid 150.

The PCCE 140 may determine the current adjustment to the power to be supplied to the electric grid 150, responsive to receiving a signal indicating the grid frequency and/or a direction of the change in the grid frequency (e.g., in response to the grid frequency moving lower, the power to be supplied to the electric grid 150 may be increased and responsive the grid frequency moving higher, the power to be supplied to the electric grid 150 may be decreased). The power contribution control equipment may determine power contribution by the power generators 110 (e.g., each generator) and power contribution by the power storage devices 120 (e.g., each device) to satisfy (meet) the determined power adjustment. The respective power contributions may be based on, for example, the deviation in the grid frequency from a nominal frequency and the rate of change of the deviation in the grid frequency. For example, the power storage device 120 may be assigned to charge or discharge and the power generator 120 may provide the remaining capacity.

Figure 2:
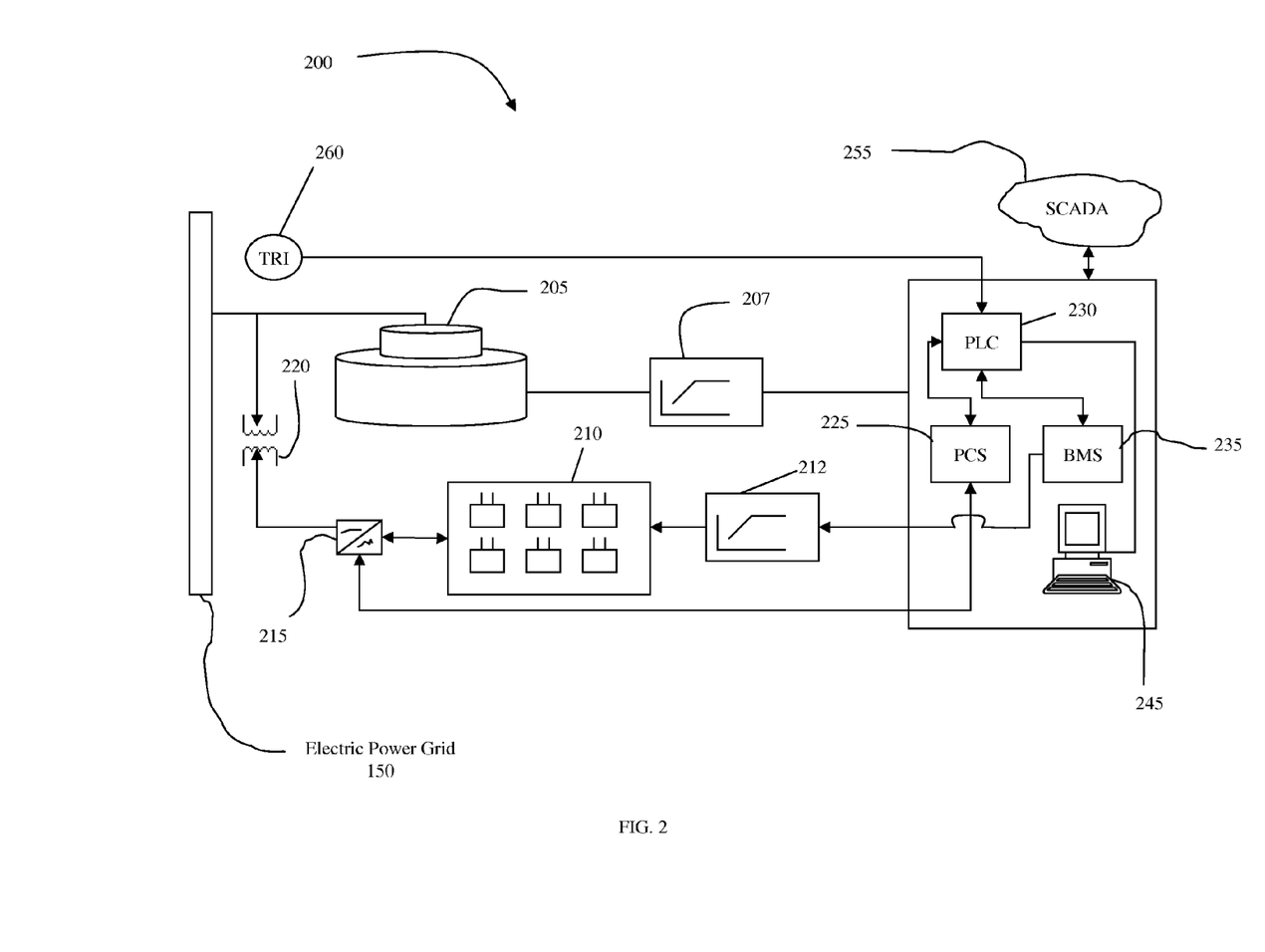
FIG. 2 is a more detailed schematic diagram illustrating a power plant connected to an electric grid, according to embodiments of the invention.

FIG. 2 is a more detailed schematic diagram illustrating an exemplary regulation unit 200 in accordance with exemplary embodiments.

Referring to FIG. 2, the regulation unit 200 (e.g., frequency or power regulation, among others) may provide energy (power) to and may receive energy from the electric grid 150. For example, the energy may be provided through a local substation or transmission lines. In this manner, the electricity grid 150 may provide an appropriate amount of power for the current load, at a specified nominal frequency, (e.g., generally 60 Hz in the United States and/or 50 Hz in some other parts of the world).

The regulation unit 200 may include at least one power generator 205, a database or storage device 207, such as an optical storage unit or a magnetic storage unit, and a set of energy storage cells 210. The power generator 205 may be configured to generate alternating current for distribution across a power grid and may be coupled to the database 207 such that the power generator 205 can have its own unique profile (individual profile). Profile generally refers to operational parameters for proper operation of the power generator 205 and may include: (1) operational limits for the power generator 205; (2) maximum, minimum and/or optimal operating set points for the power generator 205 and/or (3) ramp rates or power transient responses rates for the power generator 205.

The energy storage devices or cells (e.g., batteries) 210 may be electrically and/or energetically coupled to the electric grid 150 and may be any device suitable for storing energy. For example, in some exemplary embodiments, advanced lithium ion batteries may be used. As used herein, the term "energetically coupled" generally refers to energy that may flow from one object to another. For example, electricity in the form of an AC or DC current may flow from one object to another in a bi-directional fashion. The batteries 210 may provide energy to the electric grid 150 or power generator 205, or receive energy from the electric grid 150 or the power generator 205, for regulation, e.g., services to regulate and/or stabilize the electric grid with regard to frequency, voltage level and/or power factor, among others. Such services may include regulation services, spinning reserve services, supplemental reserve services, replacement reserve services and/or voltage control services, among others.

When providing energy to the electric grid 150, a DC current may travel from the batteries 210 to bidirectional AC/DC converters 215, which convert the DC current to an AC current. In some exemplary embodiments, inverters are used for the DC to AC conversion. When storing energy from the electric grid 150, rectifiers may be used for AC to DC conversion. Different types of inverters and rectifiers may be used, as would be apparent to one skilled in the relevant art(s). AC current flows between the bidirectional AC/DC converters 215 and the electric grid 150 via a transformer 220.

A power conversion system (PCS) 225 may include a logical control system for the AC/DC bi-directional converters 215. A programmable logic controller (PLC) 230 may instruct the PCS 225 to connect or disconnect the AC/DC converters 215 from the batteries 210 and/or the electric grid 150.

In certain exemplary embodiments, the connection between the transformer 220 and grid 150 may include or may be by a manual switch, which may be normally closed during operation of the regulation unit 200.

In certain exemplary embodiments, an AC power storage device such as a capacitor storage system or an inductive storage system may be charged or discharged for Volt-Amperes Reactive (VAR) support, for example, to adjust power factor on the electric grid.

In various exemplary embodiments, DC power storage devices such as battery storage units may be charged or discharged via a bidirectional inverter. The inverter may be controlled to provide VAR support, for example, to adjust power factor on the electric grid 150 by converting the DC power to AC power with a high power factor (e.g., above a threshold level) for supply to the electric grid 150. The control of VAR support may include determining the power factor (e.g., the phase difference between the current and voltage on the electric grid 150) or receiving an external signal (e.g., from the electric grid operator) indicating the power factor of the electric grid 150 and supplying power at a power factor above a threshold level in response to the determined or indicated power factor being below a specified threshold.

In certain exemplary embodiments, the PLC 230 may use program ladder logic to produce real-time control. The PLC 230 may send data signals to the PCS 225 via a data interface and/or may receive data signals from the PCS 225 via the data interface. Exemplary inputs to the PLC 230 from the PCS 225 may include a state of readiness signal, and exemplary outputs from the PLC 230 may include a signal indicating the amount of energy to charge or discharge, and/or instructions to connect the AC/DC converters 215 to the electric grid 150 and/or batteries 210 or to disconnect the AC/DC converters 215 from the electric grid 150 and/or batteries 210. A computer executing specific program code may also be used for this function. Such computer can be any type of computing device having one or more processors, a user input (for example, a mouse, QWERTY keyboard, touch-screen, microphone, or a T9 keyboard), and a communications infrastructure capable of receiving and transmitting data over a network. For example, the computer can include, but is not limited to, a desktop computer, a cluster of desktop computers, a server, a cluster of servers, a set-top box, or other similar type of device capable of processing instructions and receiving and transmitting data to and from the electric grid and other computing devices.

To maintain the batteries 210 in a state that enables the batteries 210 to respond to requests to add energy to or absorb energy from the electric grid 150, the regulation unit 200 may include a battery management system (BMS) 235. The BMS 235 balances the battery cells 210 and maintains knowledge of a state of charge (SOC) of the battery cells 210. The SOC of the batteries 210 may be a measurement of the current ability of the batteries to send and to receive energy (e.g., discharge or charge the energy). Exemplary inputs to the PLC 230 from the BMS 235 may include the power capabilities of the batteries 210 (e.g. in MWsec), faults, the temperature of the batteries 210, the current draw on the batteries 210 or the current drawn by the batteries 210 and the SOC, among others.

In certain exemplary embodiments, the SOC is a percentage that runs from 0% to 100%, where 100% indicates that no more energy may be stored in the batteries 210. The SOC may be calculated from the open circuit and/or closed circuit voltage levels. The SOC, however, may be calculated in any number of ways, as would be apparent to one skilled in the relevant arts.

A remote terminal unit (RTU) (not shown) may be used to connect to a Supervisory Control and Data Acquisition (SCADA) system 255. In certain exemplary embodiments, the SCADA system 255 may be associated with an operator (e.g., the ESO) that operates the electric grid 150. Exemplary inputs from the SCADA system 255 to the PLC 230 may include a request to regulate the grid frequency, the voltage level or other regulation services. The request may include an energy amount (e.g. in MW) to charge or discharge, and may include, for example, the grid frequency or other operating parameters for the electric grid 150.

Exemplary outputs from the PLC 230 may include a status and availability of the regulation unit 200. In certain exemplary embodiments, the PLC 230 may send information to the SCADA system 255 about the SOC or its capabilities so that the SCADA system 255 understands whether the regulation unit 200 may be able to provide the services to be scheduled by the ESO (e.g., knows ahead of time whether or not the regulation unit 200 can provide such services).

The PLC 230 may receive data signals from a transducer 260, which may be coupled to the electric grid 150. The transducer 260 may be configured to sense the AC signal on the electric grid 150 to determine the frequency, voltage level or/and the power factor, among others of the electricity being delivered by the electric grid 150. Although one transducer 260 is shown, it is contemplated that any number of such transducers may be used to reliably detect the appropriate grid parameters at disparate locations.

An uninterruptible power supply (not shown) may supply power to the PLC 230. The PLC 230 may send to the HVAC unit and may receive signals from an HVAC unit (not illustrated) to maintain proper environmental conditions for the batteries 210 and other components. Exemplary inputs to the PLC 230 from the HVAC unit may include temperature, humidity and other operating parameters for the HVAC unit, and exemplary outputs from the HVAC unit may include one or more thermostat settings and other control set points.

In certain exemplary embodiments, a computer 245 may be coupled to (e.g., connected to) the PLC 230 for controlling, programming, or setting parameters of the PLC 230. The computer 245 may be used to monitor the regulation unit 200. Exemplary inputs from the computer 245 to the PLC 230 may include shut-down and start-up signals. Exemplary outputs to the computer 245 may include log events, log data, and reports of alerts, among others.

When frequency or voltage regulation is performed, a request may be received at the PLC 230 from the operator (or ESO) of the electric grid 150 through the SCADA system 255 and the RTU (or using any other communication network). The request may include instructions to absorb energy from or to add energy to the electricity grid 150. In certain exemplary embodiments, the request may specify how much energy to transfer or a rate for the transfer. In response, energy may be transferred: (1) from the energy storage device to the electric grid 150 to increase the current grid frequency or to increase the grid voltage level; or (2) from the electric grid 150 to the energy storage device to decrease the current grid frequency or to decrease the grid voltage level.

The regulation may be stopped in response to another dispatch request from the ESO or operator (e.g., the operator may include an automated computer supervisory system and may occur without human intervention). For example, the operator or computer supervisory system may determine that the grid frequency and/or the voltage level may be at or near the desired nominal frequency and/or voltage level. In another example, the regulation may be stopped based on a measurement by the regulation unit 200 that the grid frequency or the grid voltage level measurement may be at or near the desired value. The regulation may be stopped for other reasons, such as the detection of a fault.

During the regulation, the SOC of the batteries 210 may rise or fall dramatically. For example, the batteries 210 may have transmitted a significant amount of energy to the electric grid 150, thus leaving the batteries 210, for example, with very little charge (e.g. an SOC in the range of about 10% to 30% and maybe around 20%). In another example, the batteries 210 may have received a lot of energy from the electric grid 150, thus leaving the batteries 210 with a large amount of charge (e.g. an SOC in the range of about 75% to 95% and maybe 85%). The charging range, for example, the range from 10% to 85% for the SOC may be dependent on many factors including the battery chemistry used (e.g., lead acid, or lithium, among others). In both of the examples, the batteries 210 may be in a poor condition to continue to regulate the grid frequency or the grid voltage level if more energy needs to be respectively added or absorbed. To provide a more reliable service, the charge on the batteries may be modified in accordance with the principles of the presently disclosed system and/or in accordance with U.S. Patent Application Publication No. 2010/0090532 A1, to maintain the batteries within a desirable range for the greatest amount of time possible. The modification may be to selectively increase or decrease the energy level (charge), as appropriate. The modification may occur (e.g., may only occur) when it is beneficial to do so, to balance the need for an appropriate SOC with the overall needs of the power distribution system.

In accordance with one exemplary embodiment, the modification may be carried out while the grid frequency or grid voltage level is in a deadband that does not use regulation. During this time, energy (or charge) may be added or removed until the SOC value, which may be monitored at the PLC 230 based on information from the BMS 230, is within a specified range. For example, the range may be centered around 50% of SOC so that the regulation unit 200 may equally provide or receive energy. In other embodiments, the target state may be higher or lower than about 50%, for example, when it is known that a large transfer of energy in a specific direction is likely.

Figure 3:
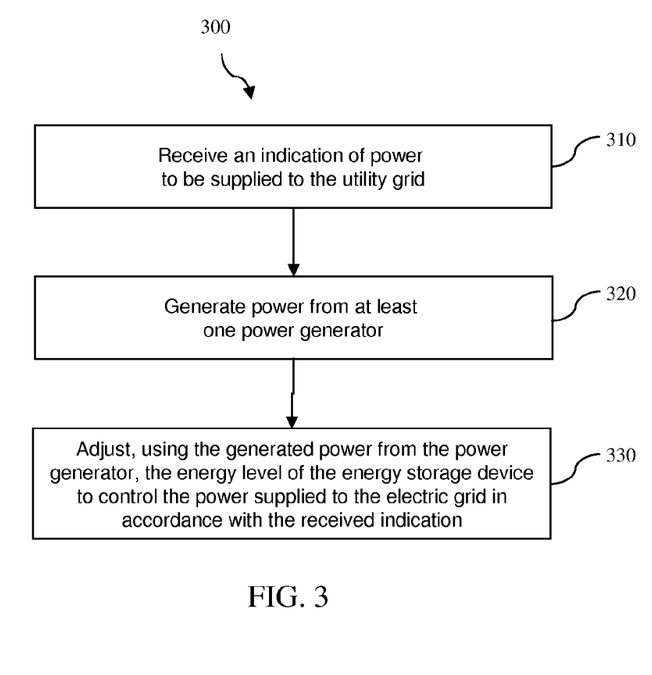
FIG. 3 is a flowchart illustrating a method of controlling power supplied to an electric grid, according to embodiments of the invention.

FIG. 3 is a flowchart illustrating a method 300 of controlling power supplied to the electric grid 150 in accordance with exemplary embodiments.

Referring to FIG. 3, at block 310, the grid indication receiver 130 may receive an indication of power to be supplied to the electric grid 150. At block 320, at least one power generator 110 may generate power. At block 330, the PCCE 140 may adjust, using the generated power from the power generator 110, the energy level of the energy storage device 120 to control the power supplied to the electric grid 150 in accordance with the received indication.

It is contemplated that the power may be stored as DC power and may be converted between AC power and DC power when storing power in the power storage device 120 and may be converted from DC power to AC power when distributing power to the electric grid 150 from the power storage device 120.

In certain exemplary embodiments, the reception of the indication at block 310 may include (1) detecting, by a detector, grid frequency changes and the adjustment of the energy of the energy storage device 120 may include controlling power contribution by generating additional power from the power generators 110 and/or distributing stored power from the power storage devices 120. The controlling of power contribution to the electric grid may be performed by controlling either the discharge of or storage of power from at least one power storage device 120 and increasing or decreasing power generation from at least one power generator 110. The controlling of power contribution may be accomplished by controlling the discharge and storage of power from at least one power storage device using a system such as the SCADA system 255 to control the generation of power.

The present method and apparatus may thereby be an add-on to control power storage and distribution from a power storage device to a legacy system. Alternatively, the system may be optimized to permit the control of both the power storage device(s) and the power generator(s) by the PCCE 140. The PCCE 140 may provide a response to detected voltage and/or frequency fluctuations on the electric grid 150 to ensure stability of the electric grid 150. For example, an energy storage device 120 may provide additional power to the electric grid 150 when the power generators 110 may be ramping up and may absorb power from the electric grid 150 when the power generators may be ramping down. The combined response of the power generators 110 and the energy storage device 120 may achieve a faster transient response than the power generators 110 alone and may also achieve improved operating efficiency and lower maintenance costs due to the use of a smaller power generator capacity that may be designed to have a slower ramp rate (or transient response) relative to a standalone generator.

Changes in grid parameters (e.g., frequency) may be detected using, for example, the transducer 260 (shown, e.g., in FIG. 2) that can measure instantaneous grid frequency changes, grid voltage changes or other grid operating parameter changes. The selection of the operating level (e.g., the SOC) of the batteries 120 may be based on the detected changes in grid frequency and/or the grid voltage. The SOC for the batteries may also be adjusted based on relatively short historical trends (e.g., in the range of about 15 seconds to about 10 minute trends) in the detected parameters. If the PCCE 140 determines that a reduction in power may be expected based on the historical trend, the batteries 120 may be operated at a reduced SOC in order to absorb additional power in the downward trending of the total power distribution. If the PCCE 140 determines that an increase in power may be expected based on the historical trend, the batteries 120 may be operated at an increased SOC in order to provide additional power in the upward trending of the total power distribution. Further, the SOC of the batteries may be controlled as disclosed in Patent Application Publication No. 2010/0090532.

Figure 4:
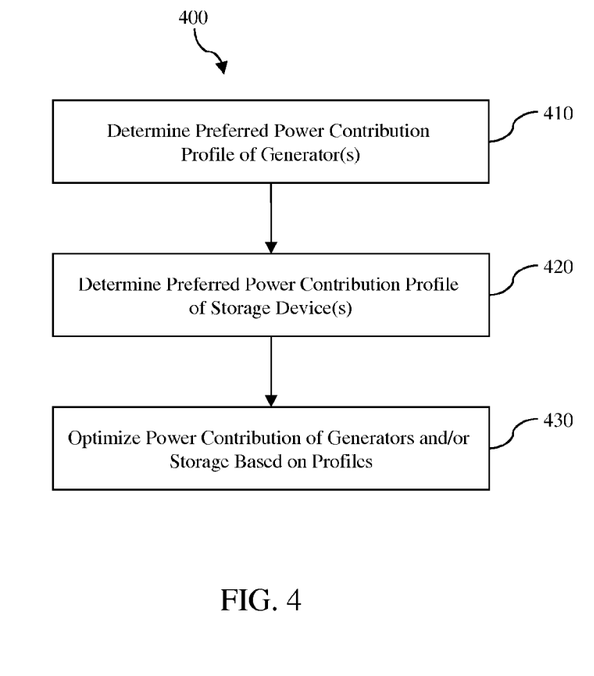
FIG. 4 is flowchart illustrating an adjustment or optimization of power contribution by generation and/or storage, according to embodiments of the invention.

FIG. 4 is flowchart illustrating an adjustment of power contribution by generation and/or storage in accordance with embodiments.

Referring to FIG. 4, at block 410, the PCCE 140 may determine the preferred or optimal power contribution profile of the power generator(s) or may use a predetermined generator profile. The profiles may be stored, for example, in the generation profile database 207. The generation profile database 207 may be formed as part of the database connected to the PLC 230, or may be connected directly to the power generators 205 (shown, for example, in FIG. 2) such that each power generator 205 may have its own unique (e.g., individual) profile.

At block 420, the PCCE 140 may determine the preferred or optimal power contribution profile of the energy storage device(s) or may use a predetermined energy storage profile. The profiles may be stored in the storage profile database 212 such that each energy storage device may have its own unique (e.g., individual) profile. Although a generation profile database 207 and a storage profile database 212 are shown, it is contemplated that one common database may include both sets of profiles.

At block 430, the PLC 230, or a computer connected thereto may optimize the power contributions of the generator(s) 110 and/or storage device(s) 120 based on the respective profiles such that various factors may be optimized. These factors include may include wear and tear, maximum rate of change of the power generator(s) 110, optimum rate of change of the power generator(s) 110, fuel consumption rate profiles of the power generator(s) 110, state of charge (SOC) of at least one power storage device 120, durability of the respective equipment 110 and 120, cost of initial acquisition and depreciation and transmission losses over the power grid 150, among many others. For example, the PCCE 140 may determine the preferred operating set points for the energy storage device(s) 120 and/or the power generator(s) 110 based on the determined or predetermined profiles and may adjust the current (present) operating set points to the preferred operating set points.

Figure 5:
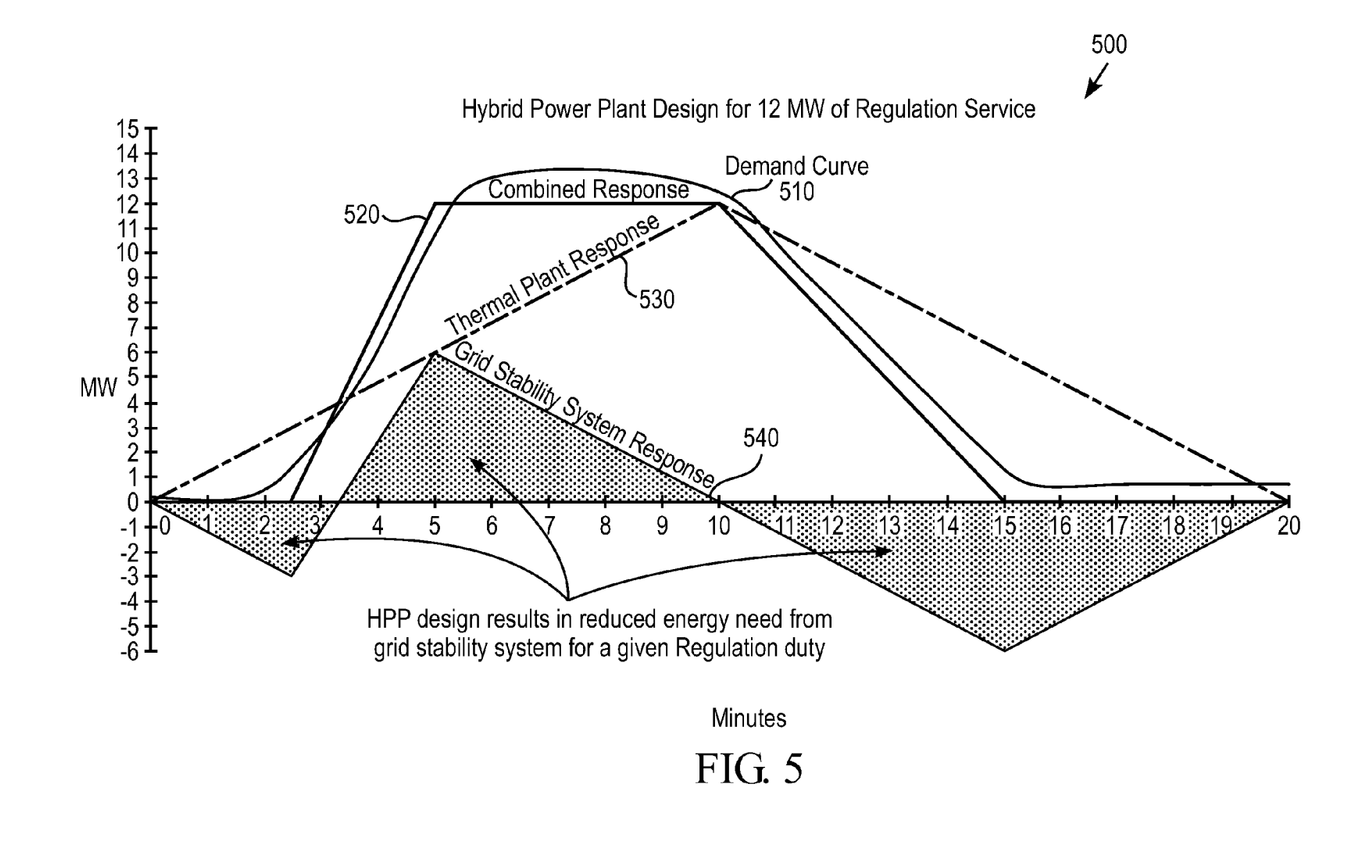
FIG. 5 is a plot illustrating a demand curve being matched by the combined response curve of a thermal electrical generation plant and a grid stability electrical storage system, according to embodiments of the invention.

FIG. 5 is a plot 500 illustrating a demand curve 510 being matched by the combined response curve 520 of a thermal electrical generation plant response 530 and a grid stability electrical storage system response 540 in accordance with exemplary embodiments. The lines are not drawn to scale, and may be more exact, according to a particular implementation.

Referring to FIG. 5, by combining the battery based energy storage system 120 with a power plant 100 or 170 (i.e., the power plant 100 or 170 may operate in conjunction with the battery based storage system), the ramping capabilities of that power plant 100 or 170 may be increased relative to a standalone power generator. The power plant may ramp-up or ramp-down from a set point while the battery energy storage system 120 may regulate the power plant to satisfy the demand curve.

One skilled in the relevant art understands that the demand curve 510 is a plot of the load demand which may be provided sequentially in real-time from the ESO or operator via the grid indication receiver 130, as a sequence of demand load levels. Because the electric grid 150 is controlled in real-time, the relatively short historical trends in the demand curve may be used by the PCCE 140 for establishment of the actual set points for the power generator(s) 110 and energy storage device(s) 120.

In certain exemplary embodiments, the battery energy storage devices 120 may act as a buffer to the electricity grid 150 and may supply faster ramping than possible with the power plant alone.

The foregoing examples have been described in the context of frequency regulation, in which power is added to or absorbed from the electric grid 150 for purposes of load following. In this situation, the decision to add or absorb power is based upon the instantaneous value of the operating frequency or instantaneous operating voltage relative to ramp limits and optimal performances. The principles described herein are equally applicable to other ancillary services of the electric grid. For example, to respond to a rapid drop in the operating frequency, a parameter such as the rate of change of the frequency could be employed in addition to, or in lieu of, the instantaneous value of the operating frequency, as a trigger for an instruction to add power to the electric grid. Within different applications for ancillary services, the set points of the device may be modified for that service using the same control and logic structure described for frequency or voltage regulation.

Although a hybrid power plant is described as including one or more energy storage devices, it is contemplated that any generator or any generation sink having a ramp rate sufficient to stabilize the electric grid may be used in addition to or in lieu of the energy storage devices. Such generators or generation sinks may increase the efficiency of existing power generators by reducing or eliminating spinning reserve capacity.

It is to be understood that exemplary embodiments as described above can be implemented in the form of control logic using hardware and/or using computer software in a modular or integrated manner. Based on the disclosure and teachings provided herein, a person skilled in the relevant art(s) would know and appreciate other ways and/or methods to implement the exemplary embodiments using hardware such as the computer system 600 illustrated in FIG. 6 and/or a combination of hardware and software.

Any of the software components or functions described in this application, may be implemented as software code to be executed by a computing device and/or processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The non-transitory computer readable medium may include storage devices, such as, but not limited to, magnetic or optical disks or tape, solid state memory devices, program cartridges and cartridge interfaces (such as that found in video game devices), a removable memory chip (such as an EPROM, or PROM) and associated socket, and other computer readable media and interfaces which allow software and data to be transferred from storage to a computing device.

Aspects of the present invention shown in FIGS. 1-5, or any part(s) or function(s) thereof, may be implemented using hardware, software modules, firmware, tangible computer readable media having instructions stored thereon, or a combination thereof and may be implemented in one or more computer systems or other processing systems.

Figure 6:
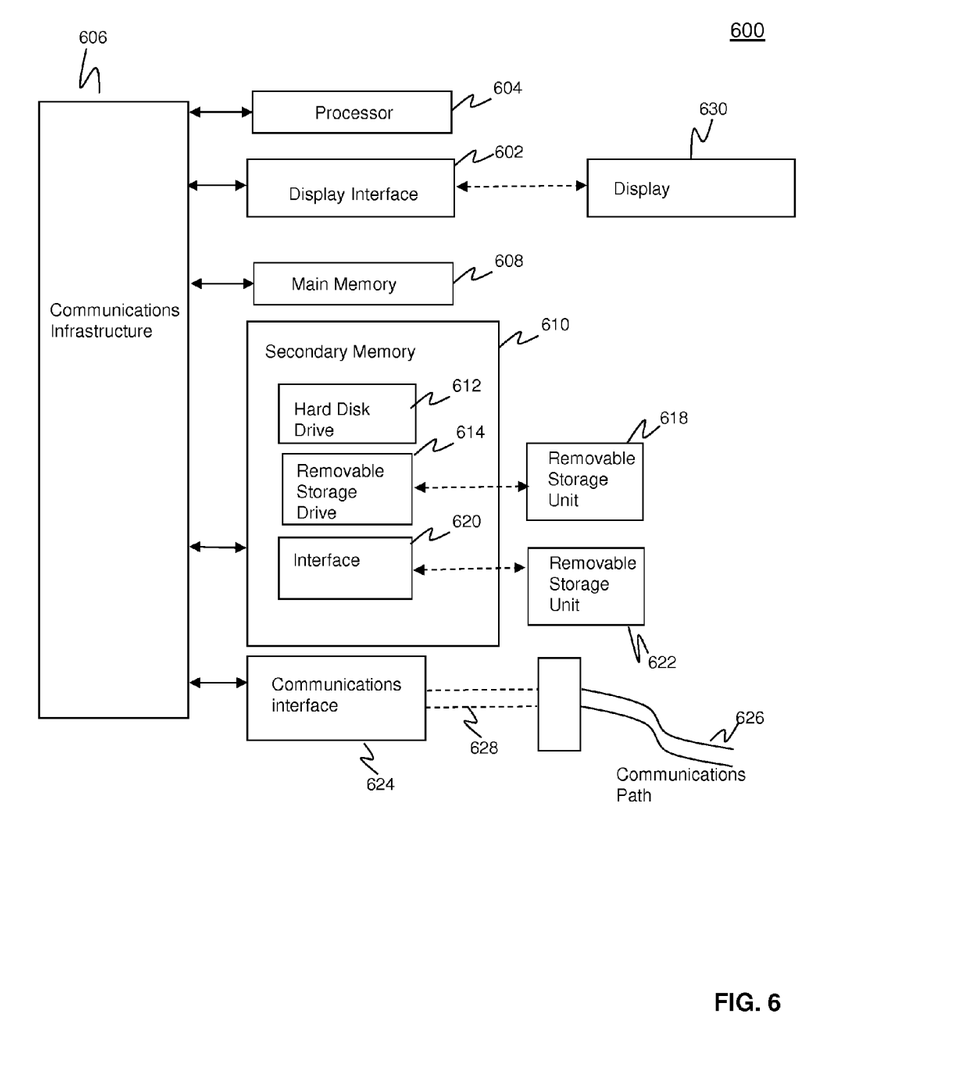
FIG. 6 is a diagram of an example computer system in which embodiments can be implemented.

FIG. 6 illustrates an example computer system 600 in which embodiments of the present invention, or portions thereof, may be implemented as computer-readable code. For example, the power plant 100, regulation unit 200, and methods 300 and 400 of FIGS. 1-4, can be implemented in computer system 600 using hardware, software, firmware, non-transitory computer readable media having instructions stored thereon, or a combination thereof and may be implemented in one or more computer systems or other processing systems. Hardware, software, or any combination of such may embody any of the modules and components used to implement the components of FIGS. 1-5. For example, the display 630 and display interface 602 can be configured to render the plot 500 of a demand curve matched by a combined response curve of a thermal electrical generation plant response and a grid stability electrical storage system response illustrated in FIG. 5.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 600. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. As will be appreciated by persons skilled in the relevant art, processor device 604 may also be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612, removable storage drive 614. Removable storage drive 614 may comprise a floppy disk drive, a magnetic tape drive, an optical disk drive, a flash memory, or the like.

The removable storage drive 614 reads from and/or writes to a removable storage unit 618 in a well-known manner. Removable storage unit 618 may comprise a floppy disk, magnetic tape, optical disk, etc. which is read by and written to by removable storage drive 614. As will be appreciated by persons skilled in the relevant art, removable storage unit 618 includes a non-transitory computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 may be in the form of signals, which may be electronic, electromagnetic, optical, or other signals capable of being received by communications interface 624. These signals may be provided to communications interface 624 via a communications path 626. Communications path 626 carries signals and may be implemented using wire or cable, fiber optics, a phone line, a cellular phone link, an RF link or other communications channels.

In this document, the terms "computer program medium," "non-transitory computer readable medium," and "computer usable medium" are used to generally refer to media such as removable storage unit 618, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor device 604 to implement the processes of the present invention, such as the steps in the methods illustrated by the flowcharts 300 and 400 of FIGS. 3 and 4, discussed above. Accordingly, such computer programs represent controllers of the computer system 600. Where the invention is implemented using software, the software may be stored in a computer program product and loaded into computer system 600 using removable storage drive 614, interface 620, and hard disk drive 612, or communications interface 624.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of controlling power supplied to an electric grid using at least one energy storage device to store energy, the method comprising:
   receiving, in a grid indication receiver, an indication of power to be supplied to the electric grid;
   generating power from at least one power generator;
   receiving, by a controller, the received indication of power to be supplied to the grid from the grid indication receiving device;
   determining, by the controller, an optimum discharge and storage profile of the at least one energy storage device or a predetermined power discharge and storage profile of the at least one energy storage device;
   adjusting, by the controller, the storage of energy by the at least one energy storage device according to the optimum discharge and storage profile or the predetermined power discharge and storage profile of the at least one energy storage device; and
   adjusting, based on the optimum or predetermined power discharge and storage profile of the at least one energy storage device, power generation from the at least one power generator to satisfy the indication of power to be supplied to the electric grid received from the grid indication receiver,
   wherein the indication includes at least one of:
   (1) a signal that indicates a present power supply level to be supplied to the electric grid,
   (2) a signal indicating a grid frequency for determining a present adjustment to the power to be supplied to the electric grid, or
   (3) one or more operating parameters indicating one or more operating set points for operation of a combination of the at least one power generator and the energy storage device, and
   wherein the optimum or the predetermined power discharge and storage profile of the at least one energy storage device and an optimum or a predetermined ramp profile of the at least one power generator are based on at least two factors selected from the group consisting of:
   (1) wear and tear on respective equipment;
   (2) an optimum rate of change of the at least one power generator;
   (3) a fuel consumption rate profile of the at least one power generator;
   (4) a state of charge (SOC) of the at least one energy storage device;
   (5) a durability of the respective equipment,
   (6) costs of initial acquisition and depreciation of the at least one power generator and the at least one energy storage device; and
   (7) transmission losses of the power distributed by the electric grid.

2. The method of claim 1, further comprising:
   collocating the at least one power generator and the at least one energy storage device together at a power generation site; and
   coupling, via a station transformer at the power generation site, an output of the at least one power generator and an output of the at least one energy storage device to the electric grid.

3. The method of claim 1, wherein responsive to receiving one or more parameters indicating one or more operating set points for a combination of the at least one power generator and the at least one energy storage device, determining, by the controller, the one or more other operating set points for each of the at least one energy storage device and the at least one power generator such that the combination of the at least one power generator and the at least one energy storage device satisfies the one or more operating set points indicated by the received one or more parameters.

4. The method of claim 1, further comprising:
   adjusting the generated power from the at least one power generator simultaneously with the adjustment of an energy level of the at least one energy storage device to meet the power to be supplied to the electric grid.

5. The method of claim 4, wherein the adjusting of the generated power from the at least one power generator simultaneously with the adjustment of the energy of the at least one energy storage device includes one of:

(1) discharging the at least one energy storage device and increasing the power supplied from the at least one power generator;
(2) discharging the at least one energy storage device and decreasing the power supplied from the at least one power generator;
(3) charging the at least one energy storage device and decreasing the power supplied from the at least one power generator; or
(4) charging the at least one energy storage device and increasing the power supplied from the at least one power generator.

6. The method of claim 5, wherein:
the discharging of the at least one energy storage device and the increasing of the power supplied from the at least one power generator includes discharging stored power during initial ramp-up in power generation by the at least one power generator; and
the charging of the at least one energy storage device and decreasing of the power supplied from the at least one power generator includes storing power for later transmission on the electric grid during ramp-down in the power generation by the at least one power generator.

7. The method of claim 1, wherein the at least one energy storage device includes a converter for converting direct current (DC) to alternating current (AC) and AC to DC.

8. The method of claim 1, further comprising:
responsive to receiving the signal indicating the grid frequency, determining a present adjustment to the power to be supplied to the electric grid; and
determining power contribution from the at least one power generator and power contribution from the at least one energy storage device to satisfy the determined present adjustment.

9. The method of claim 1, further comprising responsive to receiving the signal that indicates the present power supply level to be supplied to the electric grid, determining power contribution from the at least one power generator and power contribution from the at least one energy storage device to satisfy the indicated present power supply level.

10. The method of claim 1, wherein the reception of the signal indicating the grid frequency includes detecting instantaneous grid frequency.

11. The method of claim 1, wherein:
the received indication is a sequence of indications that indicate the power to be supplied to the electric grid during a period of time; and
the at least one energy storage device and the at least one power generator have different power transient responses.

12. The method of claim 11, further comprising:
regulating the power supplied to the electric grid using either the at least one energy storage device or the at least one power generator that has a faster power transient response.

13. The method of claim 11, further comprising:
determining a first component associated with power supply fluctuations below a threshold frequency and a second component associated with the power fluctuations at or above the threshold frequency;
adjusting the energy level of the at least one energy storage device in accordance with the first component; and
adjusting generation of power from the at least one power generator in accordance with the second component.

14. The method of claim 1, further comprising:
storing energy in the at least one energy storage device: (1) at a first level that is below capacity during periods in which power demands on the electric grid are expected to decrease; and (2) at a second level, higher than the first level, during periods in which the power demands on the electric grid are expected to increase.

15. The method of claim 1, further comprising:
adjusting the power generation from the at least one power generator according to an optimum ramp profile or a predetermined ramp profile of the at least one power generator; and
adjusting, based on the optimum or the predetermined ramp profile, the energy level of the at least one energy storage device to satisfy the received indication.

16. An apparatus for controlling power supplied to an electric grid using at least one power generator and at least one energy storage device coupled to the electric grid, the apparatus comprising:
a grid indication receiver configured to receive an indication of power to be supplied to the electric grid; and
a controller configured to receive the indication of power to be supplied to the grid from the grid indication receiver, determine an optimum discharge and storage profile of the at least one energy storage device or a predetermined power discharge and storage profile of the at least one energy storage device, adjust the storage of energy by the at least one energy storage device according to the optimum discharge and storage profile or the predetermined power discharge and storage profile of the at least one energy storage device, and adjust, based on the optimum or predetermined power discharge and storage profile of the at least one energy storage device, power generation from the at least one power generator to satisfy the indication of power to be supplied to the electric grid received from the grid indication receiver,
wherein the indication includes at least one of:
(1) a signal that indicates a present power supply level to be supplied to the electric grid,
(2) a signal indicating a grid frequency for determining a present adjustment to the power to be supplied to the electric grid, or
(3) one or more operating parameters indicating one or more operating set points for operation of a combination of the at least one power generator and the energy storage device, and
wherein the optimum or the predetermined power discharge and storage profile of the at least one energy storage device and an optimum or a predetermined ramp profile of the at least one power generator are based on at least two factors selected from the group consisting of:
(1) wear and tear on respective equipment;
(2) an optimum rate of change of the at least one power generator;
(3) a fuel consumption rate profile of the at least one power generator;
(4) a state of charge (SOC) of the at least one energy storage device;
(5) a durability of the respective equipment,
(6) costs of initial acquisition and depreciation of the at least one power generator and the at least one energy storage device; and
(7) transmission losses of the power distributed by the electric grid.

17. The apparatus of claim 16, wherein in response to receiving the one or more parameters indicating one or more operating set points for the combination of the at least one power generator and the at least one energy storage device, the controller is configured to determine the one or more other operating set points for each of the at least one energy storage device and the at least one power generator such that the combination of the at least one power generator and the at least one energy storage device satisfies the one or more operating set points indicated by the received one or more parameters.

18. The apparatus of claim 16, wherein the controller adjusts the generated power from the at least one power generator simultaneously with the adjustment of the energy level of the at least one energy storage device to meet the power to be supplied to the electric grid.

19. The apparatus of claim 18, wherein the controller is further configured to control one of:
(1) discharging the at least one energy storage device and increasing the power supplied from the at least one power generator;
(2) discharging the at least one energy storage device and decreasing the power supplied from the at least one power generator;
(3) charging the at least one energy storage device and decreasing the power supplied from the at least one power generator; or
(4) charging the at least one energy storage device and increasing the power supplied from the at least one power generator based on the received indication from the grid indication receiver.

20. The apparatus of claim 16, wherein:
the grid indication receiver is further configured to receive a sequence of indications indicating the power to be supplied to the electric grid during a period of time; and
the at least one energy storage device and the at least one power generator have different power transient responses such that one of the at least one energy storage device or the at least one power generator that has a faster power transient response regulates the power supplied to the electric grid.

21. The apparatus of claim 16, further comprising:
a filtering unit configured to determine a first component associated with power supply fluctuations below a threshold frequency and a second component associated with the power fluctuations at or above the threshold frequency, wherein,
the controller is further configured to adjust the energy level of the at least one energy storage device in accordance with the first component and adjusts the generation of power from the at least one power generator in accordance with the second component.

22. The apparatus of claim 16, wherein:
the at least one power generator includes at least one of:
(1) a hydro-electric power generator;
(2) a fossil-fueled power generator;
(3) a nuclear power generator;
(4) a wind harnessing power generator;
(5) a tidal power generator;
(5) a geothermal power generator; or
(6) a solar power generator; and
the at least one energy storage device includes at least one of:
(1) a battery;
(2) a capacitor;
(3) an inertial power storage system;
(4) a pneumatic system; or
(5) a suspended mass system.

23. The apparatus of claim 16, wherein the at least one energy storage device includes a converter for converting direct current (DC) to alternating current (AC) and AC to DC.

24. The apparatus of claim 16, wherein the controller is further configured to control the at least one energy storage device to store energy:
(1) at a first level that is below capacity during periods in which power demands on the electric grid are expected to decrease; and
(2) at a second level that is higher than the first level, during periods in which the power demands on the electric grid are expected to increase.

25. The apparatus of claim 16, wherein the controller is further configured to adjust power generation from the at least one power generator according to an optimum ramp profile or a predetermined ramp profile of the at least one power generator and adjusts, based on the optimum ramp profile or the predetermined ramp profile, the storage of energy of the at least one energy storage device to satisfy the received indication.

26. A system for controlling power supplied to an electric grid, the system comprising:
a grid indication receiver configured to receive an indication of power to be supplied to the electric grid;
at least one power generator configured to generate power, the at least one power generator being connected to the electric grid;
at least one energy storage device configured to store energy, the at least one energy storage device being coupled to the at least one power generator and the electric grid;
a controller configured to receive the indication of power to be supplied to the grid from the grid indication receiver, determine an optimum discharge and storage profile of the at least one energy storage device or a predetermined power discharge and storage profile of the at least one energy storage device, adjust the storage of energy by the at least one energy storage device according to the optimum discharge and storage profile or the predetermined power discharge and storage profile of the at least one energy storage device, and adjust, based on the optimum or predetermined power discharge and storage profile of the at least one energy storage device, power generation from the at least one power generator to satisfy the indication of power to be supplied to the electric grid received from the grid indication receiver,
wherein the indication includes at least one of:
(1) a signal that indicates a present power supply level to be supplied to the electric grid,
(2) a signal indicating a grid frequency for determining a present adjustment to the power to be supplied to the electric grid, or
(3) one or more operating parameters indicating one or more operating set points for operation of a combination of the at least one power generator and the energy storage device, and
wherein the optimum or the predetermined power discharge and storage profile of the at least one energy storage device and an optimum or a predetermined ramp profile of the at least one power generator are based on at least two factors selected from the group consisting of:
(1) wear and tear on respective equipment;
(2) an optimum rate of change of the at least one power generator;

(3) a fuel consumption rate profile of the at least one power generator;
(4) a state of charge (SOC) of the at least one energy storage device;
(5) a durability of the respective equipment,
(6) costs of initial acquisition and depreciation of the at least one power generator and the at least one energy storage device; and
(7) transmission losses of the power distributed by the electric grid.

27. A non-transitory computer readable storage medium having instructions stored thereon that, in response to execution by a computing device, cause the computing device to perform operations for controlling power supplied to an electric grid using at least one energy storage device to store energy, the operations comprising:

receiving an indication of power to be supplied to the electric grid from a grid indication receiving device;
generating power from at least one power generator;
determining an optimum discharge and storage profile of the at least one energy storage device or a predetermined power discharge and storage profile of the at least one energy storage device;
adjusting the storage of energy by the at least one energy storage device according to the optimum discharge and storage profile or the predetermined power discharge and storage profile of the at least one energy storage device; and
adjusting, based on the optimum or predetermined power discharge and storage profile of the at least one energy storage device, power generation from the at least one power generator to satisfy the indication of power to be supplied to the electric grid received from the grid indication receiver, wherein the indication includes at least one of:
(1) a signal that indicates a present power supply level to be supplied to the electric grid,
(2) a signal indicating a grid frequency for determining a present adjustment to the power to be supplied to the electric grid, or
(3) one or more operating parameters indicating one or more operating set points for operation of a combination of the at least one power generator and the energy storage device, and wherein the optimum or the predetermined power discharge and storage profile of the at least one energy storage device and an optimum or a predetermined ramp profile of the at least one power generator are based on at least two factors selected from the group consisting of:
(1) wear and tear on respective equipment;
(2) an optimum rate of change of the at least one power generator;
(3) a fuel consumption rate profile of the at least one power generator;
(4) a state of charge (SOC) of the at least one energy storage device;
(5) a durability of the respective equipment,
(6) costs of initial acquisition and depreciation of the at least one power generator and the at least one energy storage device; and
(7) transmission losses of the power distributed by the electric grid.

28. The method of claim 1, wherein the optimum or the predetermined power discharge and storage profile of the at least one energy storage device and an optimum or a predetermined ramp profile of the at least one power generator are based on wear and tear on the at least one power generator and the at least one energy storage device.

* * * * *